(12) United States Patent
Morey et al.

(10) Patent No.: US 12,049,419 B2
(45) Date of Patent: Jul. 30, 2024

(54) COMBINED CYCLE POWER PLANT UTILIZING ORGANIC WATER ADDITIVES

(71) Applicant: Ecolab USA Inc., Saint Paul, MN (US)

(72) Inventors: David Morey, Shorewood, IL (US); Phillip Egebrecht, West Chicago, IL (US)

(73) Assignee: Ecolab USA Inc., Saint Paul, MN (US)

( * ) Notice: Subject to any disclaimer, the term of this patent is extended or adjusted under 35 U.S.C. 154(b) by 109 days.

(21) Appl. No.: 17/869,873

(22) Filed: Jul. 21, 2022

(65) Prior Publication Data

US 2023/0027437 A1    Jan. 26, 2023

Related U.S. Application Data

(60) Provisional application No. 63/224,149, filed on Jul. 21, 2021.

(51) Int. Cl.
*C02F 5/10* (2023.01)
*C02F 1/20* (2023.01)
(Continued)

(52) U.S. Cl.
CPC .................. *C02F 5/10* (2013.01); *C02F 1/20* (2013.01); *C02F 1/32* (2013.01); *F01K 23/10* (2013.01);
(Continued)

(58) Field of Classification Search
None
See application file for complete search history.

(56) References Cited

U.S. PATENT DOCUMENTS 3,880,226 A     4/1975   Houser et al.
4,622,306 A  *  11/1986  Duve .................... F22D 11/006
                                                    422/62

(Continued)

FOREIGN PATENT DOCUMENTS

CN      104330526 B    2/2016
CN      109682860 A    4/2019
(Continued)

OTHER PUBLICATIONS

International Patent Application No. PCT/US2022/037780, International Search Report and Written Opinion mailed Dec. 13, 2022, 14 pages.
(Continued)

*Primary Examiner* — Clare M Perrin
(74) *Attorney, Agent, or Firm* — Fredrikson & Byron, P.A.

(57) ABSTRACT

Organic water conditioning agents may be added to an aqueous stream that is supplied to a steam generator, such as a heat recovery steam generator within a combined cycle power plant. These organic water conditioning agents may degrade to electrically-charged decomposition products that can interfere with cation conductivity measurements made on the aqueous stream. To allow deployment of the organic water conditioning agents, a sampling device can process aqueous samples to destroy interfering organic molecules, such as through heat or irradiation. Cation conductivity measurements can then be made on the aqueous sample after destroying and removing interfering organic species from the sample stream.

23 Claims, 3 Drawing Sheets

(51) Int. Cl.
  *C02F 1/32* (2023.01)
  *F01K 23/10* (2006.01)
  *C02F 103/02* (2006.01)

(52) U.S. Cl.
  CPC ...... *C02F 2103/02* (2013.01); *C02F 2209/05* (2013.01); *F05D 2220/72* (2013.01); *F05D 2260/61* (2013.01)

(56) References Cited

U.S. PATENT DOCUMENTS

| | | | |
|---|---|---|---|
| 5,189,873 | A | 3/1993 | Mishima et al. |
| 5,864,596 | A * | 1/1999 | Egerbrecht ........... F22B 37/486 |
| | | | 525/329.7 |
| 5,876,623 | A * | 3/1999 | Tang ..................... C02F 5/12 |
| | | | 210/698 |
| 6,228,950 | B1 | 5/2001 | Egerbrecht et al. |
| 6,430,249 | B2 | 8/2002 | Egerbrecht et al. |
| 8,051,654 | B2 | 11/2011 | Kirzhner |
| 8,129,696 | B2 | 3/2012 | Miller |
| 9,611,160 | B2 | 4/2017 | Underwood et al. |
| 9,882,453 | B2 | 1/2018 | Schlesier et al. |
| 2007/0017207 | A1 | 1/2007 | Smith et al. |
| 2009/0246882 | A1 | 10/2009 | Pochy et al. |
| 2011/0185744 | A1 | 8/2011 | Tong et al. |
| 2016/0115826 | A1 | 4/2016 | Eroglu |
| 2018/0273412 | A1 | 9/2018 | Hall et al. |
| 2019/0301308 | A1 | 10/2019 | Sekine et al. |

FOREIGN PATENT DOCUMENTS

| | | |
|---|---|---|
| EP | 3112750 A1 | 1/2017 |
| WO | 8803633 A1 | 5/1988 |
| WO | 2008078668 A1 | 7/2008 |

OTHER PUBLICATIONS

Barben et al., "Conductivity measurement of high purity water in power plants," ISA Transactions, vol. 27, No. 3, Jan. 1988, pp. 25-36, Abstract Only.

"Cation Conductivity Sample Module," GE Infrastructure Water & Process Technologies, Fact Sheet, 2004, 2 pages.

"Dispersant Application Reduces Deposit Fouling in PWR Steam Generators," Electric Power Research Institute, Jan. 2009, 2 pages.

"Dispersants for Tube Fouling Control—Volume 1: Qualification for a Short-Term Trial at ANO-2," Electric Power Research Institute, Technical Report, 1001422, Mar. 2001, 390 pages.

"Dispersants for Tube Fouling Control—Volume 2: Short-Term Trial at ANO-2," Electric Power Research Institute, Technical Report, 1003144, Sep. 2001, 192 pages.

"Dispersants for Tube Fouling Control—Volume 3: Qualification for a Long-Term Trial in a Replacement Steam Generator Tubed with Alloy 690 TT," Electric Power Research Institute, Technical Report, 1002774, Dec. 2002, 183 pages.

"Effect of Polymer Dispersant on Flow-Accelerated Corrosion of Steam Generator Materials," Electric Power Research Institute, Technical Report, 1012056, Jun. 2005, 90 pages.

Maurer, "Cation Conductivity: Facts and Fiction," PowerPlant Chemistry, vol. 8, No. 11, 2006, pp. 658-664.

"Monitoring Steam Purity in Power Plants Part 1: Using Conductivity," Emerson Process Management, Application Note, 2016, 8 pages.

"Polymeric Dispersants: A Review of the Literature," Electric Power Research Institute, TE-114159, Technical Progress, Dec. 1999, 50 pages.

"Combined Cycle Power Plant—An Overview," Retrieved online from <https://www.sciencedirect.com/topics/engineering/combined-cycle-power-plant> on Jul. 23, 2020, 13 pages.

* cited by examiner

COMBINED CYCLE POWER PLANT UTILIZING ORGANIC WATER ADDITIVES

CROSS REFERENCE

This application claims the benefit of U.S. Provisional Patent Application No. 63/224,149, filed Jul. 21, 2021, the entire contents of which are incorporated herein by reference.

TECHNICAL FIELD

This disclosure relates to the use of organic water additives in steam generator systems and, more particularly, to systems and techniques that protect against measurement interference caused by the use of organic water additives.

BACKGROUND

The process for converting energy in a fuel into electric power involves the creation of mechanical work, which is then transformed into electric power by a generator. To increase the overall efficiency of electric power plants, multiple processes can be combined to recover and utilize the residual heat energy in hot exhaust gases. In combined cycle mode, for example, power plants can achieve electrical efficiencies up to 60 percent or greater. Combined cycle refers to the combination of multiple thermodynamic cycles to generate power. For example, combined cycle operation can utilize a heat recovery steam generator (HRSG) that captures heat from high temperature exhaust gases from a gas-fired turbine to produce steam, which is then supplied to a steam turbine to generate additional electric power. The most common type of combined cycle power plant utilizes gas turbines and is called a combined cycle gas turbine (CCGT) plant.

In practice, contaminated steam can cause damage to the turbine and other components of a power generation facility, causing expensive and unplanned shutdowns. Impurities in steam can cause corrosion and/or deposit formation in the turbine. Major corrosion-causing impurities are sodium, chloride, and sulfate. A significant scale-forming contaminant is silica. Since many contaminants of concern are ionic, conductivity can be used to detect and monitor the presence of such contaminants. Non-corrosive soluble species or contaminates that interfere in the conductivity measurements can mask important information concerning the health and operation of the steam generating system.

SUMMARY

In general, this disclosure is directed to devices, systems, and techniques for processing aqueous streams to remove interfering species to facilitate conductivity measurements and/or controlling chemical treatment of an aqueous streams subject to conductivity measurement and control. In some examples, an aqueous stream is supplied to a steam generator, such as a heat recovery steam generator within a combined cycle power plant. The electrical conductivity of the aqueous stream may be monitored during operation to detect corrosive anions, such as sodium, chloride, and/or sulfate, which may cause corrosion within the fluid system, particularly the steam turbine driving the generator that generates electricity within the power plant. In implementations where conductivity measurements are used to monitor the integrity of the aqueous system and detect problems needing remediation, it can be challenging to use water conditioning agents that impact the conductivity of the water. For example, organic water conditioning agents such as polymeric dispersants may breakdown into organic acids that change the electrical conductivity of the water stream. Although these organic acids are relatively benign from a corrosion perspective, they can increase the conductivity of the water stream, potentially interfering with and masking the ability of conductivity measuring equipment to detect the presence of corrosive anions desirably monitored.

In accordance with some examples of the present disclosure, however, devices, systems, and techniques are described that can remove interfering organic species from a water sample, allowing the conductivity of harmful inorganic species, such as corrosive anions, that may be present in the water sample to be measured. As a result, organic water conditioning agents that degrade into charged decomposition products can be applied while still measuring the conductivity of inorganic species that may be present in the water and, if desired, allowing control action to be taken based on the measured conductivity to mitigate the effects of harmful inorganic species.

In some implementations, a technique for chemically treating water supplied to a steam generator involves introducing an organic water conditioning agent into an aqueous stream. A sample of the aqueous stream containing the organic water conditioning agent and any acid decomposition products thereof is extracted for analysis. The conductivity of the sample can be analyzed to determine a specific conductivity of the sample (e.g., a total conductivity caused by both organic and inorganic species). In either case, the sample can be processed in a reaction chamber to destroy interfering organic species, including organic water conditioning agent and any acid decomposition products thereof. For example, the sample may be heated and/or irradiated to breakdown the interfering organic species into carbon dioxide that may be off-gassed. The sample can then be passed through a cation exchange resin to remove cations from the sample and the conductivity of the sample again measured to provide a cation conductivity measurement.

Although a conductivity measurement taken downstream of a cation exchange resin may be referred to as a cation conductivity measurement as a matter of typical practice, the conductivity measurement is not detecting cations but rather anions since the cations have been removed by the cation exchange resin. In practice, the cation resin may be selected so that substantially any cations in the sample exchange with a hydrogen ion on the resin. As a result, the resin converts ionic contaminants into a corresponding acid for conductivity measurement. For example, in the case of sodium chloride, the sodium chloride dissociates into sodium cations and chloride anions. The cation resin can remove the sodium, replacing it with a hydrogen ion to produce hydrochloric acid. The resulting conductivity measurement detects the anions present in the sample. Accordingly, while referred to as cation conductivity, the conductivity measurement may also be referred to as acid conductance or conductivity after cation exchange (CACE).

Independent of the terminology used to refer to the conductivity measurement made after cation exchange using the techniques described herein, the conductivity measurement may be used to measure the conductivity associated with inorganic species of potential concern without masking or interference caused by the addition of organic agents added to the water. Rather, an organic agent may be added to the water stream to impart desired functional properties and then destroyed (in its original form and/or in its decomposed form), e.g., in a sample stream, prior to making a cation conductivity measurement. The organic agent may be decomposed to a non-conductive species, such as carbon dioxide, through the application of heat and/or light to the sample before making the conductivity measurement. For example, the sample may be irradiated with UV light to decompose otherwise interfering organic species, allowing the conductivity associated with any inorganic species present in the water to be measured without undesired masking or interference. In this way, organic water conditioning agents may be added to improve the performance of steam generator water streams while continuing to monitor harmful inorganic agents using cation conductivity measurements, enabling continued control of the conductivity impact of those agents.

In one example, a method for chemically treating water supplied to a steam generator is described. The method involves introducing an organic water conditioning agent into an aqueous stream that is supplied to a steam generator. The steam generator generates steam from the aqueous stream containing the organic water conditioning agent to drive a steam turbine. The method includes drawing a sample of the aqueous stream containing the organic water conditioning agent and any acid decomposition products thereof and measuring a conductivity of the sample to provide a measured specific conductivity of the sample. The method also involves, after measuring the conductivity of the sample, at least one of irradiating the sample and heating the sample, thereby causing the organic water conditioning agent and any acid decomposition products thereof to decompose into a gaseous byproduct. In addition, the method includes passing the sample through a cation exchange resin to remove cations from the sample and, after passing the sample through the cation exchange resin, measuring a conductivity of the sample to provide a measured cation conductivity for the sample. In some implementations, the conductivity of the sample is also measured after at least one of irradiating the sample and heating the sample but prior to passing the sample through the cation exchange resin.

In another example, a method for chemically treating water used by a heat recovery steam generator in a combined cycle power plant is described. The method involves introducing an organic water conditioning agent into an aqueous stream and supplying the aqueous stream to a heat recovery steam generator that generates steam using thermal energy in an exhaust gas from a gas turbine, with the steam generated by the heat recovery steam generator being supplied to a steam generator. The method includes drawing a sample of the aqueous stream containing the organic water conditioning agent and any acid decomposition products thereof and measuring a conductivity of the sample to provide a measured specific conductivity of the sample. The method also involves, after measuring the conductivity of the sample, at least one of irradiating the sample and heating the sample, thereby causing the organic water conditioning agent and any acid decomposition products thereof to decompose into a gaseous byproduct. In addition, the method includes passing the sample through a cation exchange resin to remove cations from the sample and, after passing the sample through the cation exchange resin, measuring a conductivity of the sample to provide a measured cation conductivity for the sample. The method includes adjusting an amount of the organic water conditioning agent added to the aqueous stream based on the measured specific conductivity of the sample and controlling the supply and/or purity of the aqueous stream to the heat recovery steam generator based on the measured cation conductivity of the sample. In some implementations, the conductivity of the sample is also measured after at least one of irradiating the sample and heating the sample but prior to passing the sample through the cation exchange resin.

In another example, a combined cycle power plant system is described. The system includes a steam turbine, a heat recovery steam generator operable connected to the steam turbine to provide steam to the steam turbine, a condenser, piping, and a conductivity monitor. The piping fluidly connects, directly or indirectly, the heat recovery steam generator to the steam turbine, the steam turbine to the condenser, and the condenser to the heat recovery steam generator, with the piping defining a fluid network through which an aqueous stream is configured to flow. The conductivity monitoring device is positioned to receive a sample of the aqueous stream from the piping. The conductivity monitoring device includes a first conductivity sensor configured to measure a conductivity of the sample to provide a measured specific conductivity of the sample, a reaction chamber configured to receive the sample after measurement by the first conductivity sensor and at least one of irradiate the sample and heat the sample, a cation exchange resin configured to remove cations from the sample, and a second conductivity sensor configured to measure a conductivity of the sample downstream of the cation exchange resin to provide a measured cation conductivity for the sample. The example system may also include a metering device positioned to control addition of an organic water conditioning agent into the aqueous stream. In some implementations, the system also includes a third conductivity sensor to provide a specific conductivity measurement after the reaction chamber but prior to the cation exchange resin.

The details of one or more examples are set forth in the accompanying drawings and the description below. Other features, objects, and advantages will be apparent from the description and drawings, and from the claims.

DETAILED DESCRIPTION

Figure 1:
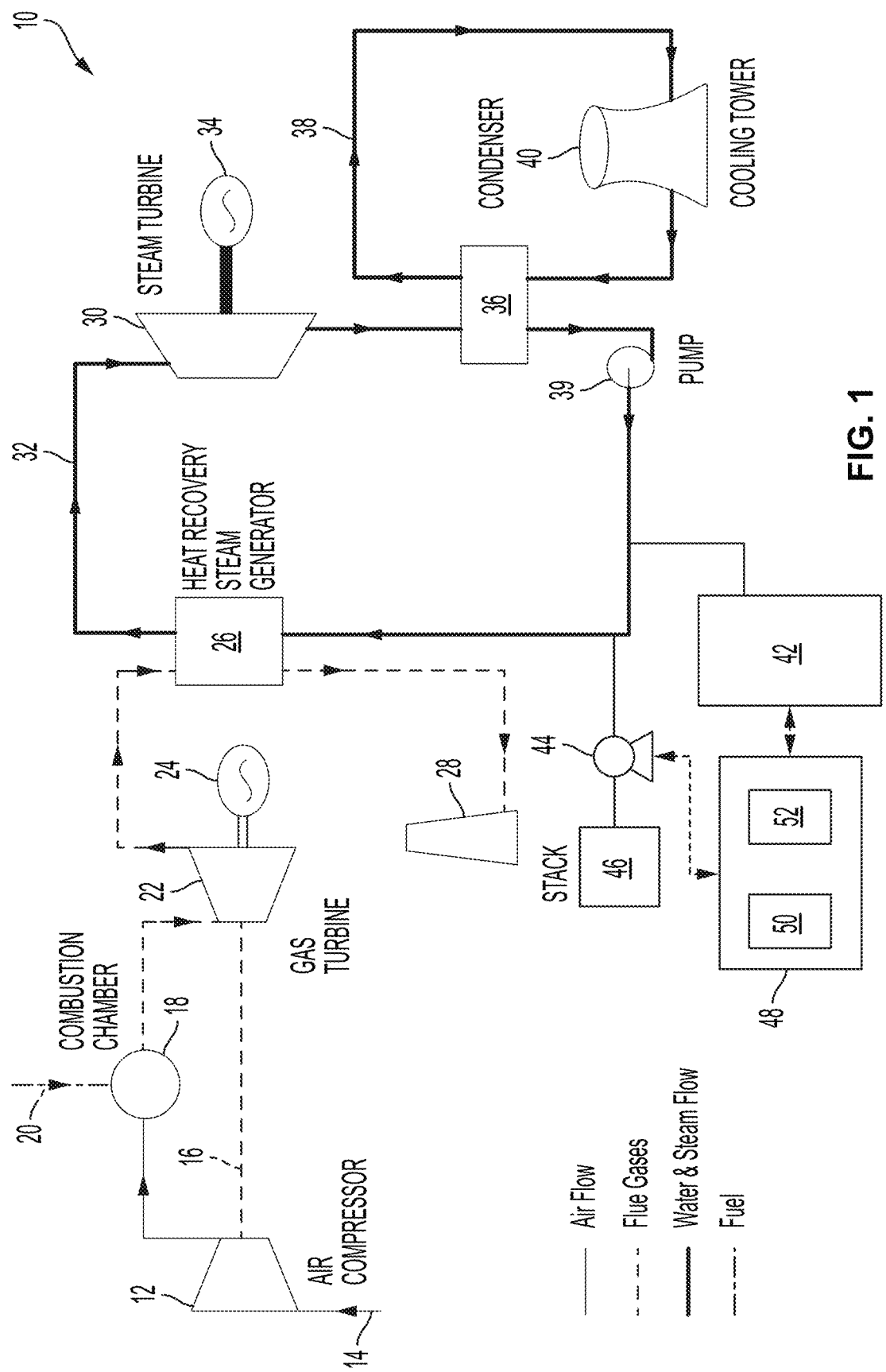
FIG. 1 is a schematic diagram of an example combined cycle power plant utilizing conductivity monitoring according to aspects of the present disclosure.

This disclosure generally relates to devices, systems, and techniques for introducing organic water conditioning agents into aqueous streams used to generate steam within power plant facilities and to facilitate conductivity measurements of the aqueous streams without interference from the added organic water conditioning agents. In some examples, an organic water conditioning agent is added to the aqueous stream. The aqueous stream is conveyed through a fluid circuit that includes a steam generator, such as a heat recovery steam generator within a combined cycle power plant.

To evaluate the characteristics of the aqueous stream, a sample of the stream is extracted for conductivity analysis. The conductivity of the sample may be analyzed prior to further processing to provide a specific conductivity measurement for the stream. The specific conductivity measurement may vary depending on the concentration of any inorganic species in the stream and any charged organic species, such as acid decomposition products produced through chemical decomposition of an organic water conditioning agent added to the stream. In either case, the sample may be processed in a reaction chamber to destroy charged organic species in the sample. For example, the sample may be heated and/or irradiated with light under conditions effective to breakdown the charged organic species, e.g., into carbon dioxide. Any inorganic species present in the sample may be substantially unaffected by the treatment in the reaction chamber. After processing, the sample may be passed through a cation exchange resin to remove cations from the sample and the conductivity of the sample measured to provide a measured cation conductivity for the sample. This measured cation conductivity can provide an indication of the presence and/or concentration of any inorganic anion species present in the sample.

Various control actions can be taken based on the one or more conductivity measurements made on the aqueous stream. For example, the amount of water conditioning agent added to the stream may be adjusted based on the measured specific conductivity. Since the water conditioning agent added to the stream may have a greater impact on the conductivity of the stream than any inorganic contaminants present in the stream, the measured specific conductivity can provide an indication of the concentration of the water conditioning agent in the stream and the need for dosing adjustment. As another example, the aqueous stream itself may be controlled based on the measured cation conductivity. A change in the measured cation conductivity (e.g., increase in the conductivity) may indicate an increase in harmful contaminants potentially damaging to the power facility. As a result, the steam generator and flow of the aqueous stream may be reduced until the harmful condition is remediated or completely shutdown for inspection and/or remediation. Additionally or alternatively, the aqueous stream may be supplemented, purified by various techniques (e.g., filtration, osmosis), and/or replaced with make-up water to reduce the concentration of the inorganic contaminants.

Example conductivity monitoring techniques and device arrangements will be described in greater detail with respect to FIG. 2. However, an example power plant system that may utilize conductivity monitoring and control according to the disclosure will first be described with respect to FIG. 1.

FIG. 1 is a schematic diagram of an example combined cycle power plant 10 utilizing conductivity monitoring according to aspects of the present disclosure. In the illustrated example, power plant 10 includes a compressor 12 that that compresses ambient or atmospheric air 14 to form a high-pressure air stream 16. High pressure air stream 16 is passed to combustion chamber 18 to mix with fuel 20 (e.g., natural gas, syngas, fuel oil) and for ignition to form high pressure, high temperature combustion products that are delivered to a gas turbine 22. Gas turbine 22 generates electrical power 24, which can be supplied to a power grid and/or other load source. Additional fuel and air may be injected and combusted between gas turbine 22 and HRSG 26, in a process called duct firing, to increase overall steam production in HRSG 26. Residual combustion gas having passed through gas turbine 22 can pass through a heat recovery steam generator (HRSG) 26 before being scrubbed and/or discharged via an emission stack 28.

HRSG 26 can extract energy from the residual combustion gas before the gas is discharged through stack 28. HRSG 26 can function as a counter flow heat exchanger with an aqueous stream (e.g., feedwater) passing through the HRSG in one direction and exhaust gas passing through the HRSG in an opposite direction. As the aqueous and gas streams pass through HRSG 26, the water may be heated (e.g., vaporized from liquid to steam) as the exhaust gas from gas turbine 22 gives up heat and becomes cooler. HRSG 26 can be implemented using a variety of different design configurations and may operate at a single operating pressure or multiple operating pressures. For example, HRSG 26 may operate at multiple operating pressures (e.g., high and low, or high, intermediate, and low). HRSG 26 may generate steam at each of the multiple pressures and/or temperatures to provide vapor feed to the corresponding stages of a steam turbine 30. Each section of HRSG 26 may include one or more economizers, evaporators, and/or superheaters.

In FIG. 1, HRSG 26 provides steam to steam turbine 30 via piping 32. Steam turbine 30 transforms the motive force of steam supplied by HRSG 26 to generate electrical power via generator 34, which can be supplied to a power grid and/or other load source. Steam having passed through steam turbine 30 can be condensed at a condenser 36. Condenser 36 may function as a heat exchanger in which steam having passed through steam turbine 30 flows in a generally crosscurrent direction to a cooling fluid 38 (e.g., cooling water or air). The steam can condense from a vapor phase to a liquid phase in condenser 36 before being pumped by pump 39 back to HRSG 26. Thermal energy transferring into the cooling fluid 38 can be removed by a cooling tower 40 through evaporative cooling (in instances in which the cooling fluid is water). When the cooling fluid is air, thermal energy may be transferred directly to atmosphere in condenser 36.

As shown in FIG. 1, HRSG 26 can be fluidly connected to the various components of the network via piping 32. For example, piping 32 can fluidly connect HRSG 26 to steam turbine 30 and, in turn, fluidly connect the steam turbine to condenser 36 which, in turn, is connected back to HRSG 26. Each component may be connected directly (e.g., with one unit connected in series with another unit without intervening operating unit) or indirectly (e.g., with one unit connected in series with another unit with intervening operating unit). Features described as piping can be implemented using one or multiple segments of tubing and can include appropriate values and other implementation hardware for realizing the piping network in practice.

To evaluate one or more characteristics of the aqueous fluid (e.g., steam) flowing through piping 32, the example system of FIG. 1 includes a conductivity monitoring device 42. Conductivity monitoring device 42 may be positioned to receive a sample of the aqueous stream through piping 32 for analysis. For example, conductivity monitoring device 42 may be fluidly connected to a primary pipe through which a majority of the aqueous stream flows by a secondary piping that draws a slip stream from the primary pipe. In either case, as will be described in more detail below, conductivity monitoring device 42 can process an aqueous sample received from piping 32 (which may be a steam sample received from piping 32 and thereafter condensed) and preform one or more conductivity measurements on the sample.

The water in piping 32 may be repeatedly circulated in the piping through numerous cycles of vaporization and condensation. Over time, the quality of the water may deteriorate and/or the concentration of contaminants in the water may increase. For these and other reasons, the water may be treated with one or more conditioning agents in accordance with aspects of the disclosure to help improve the performance of the water and/or equipment contacted by the water. For example, a water conditioning agent may be or contain a pH control agent (e.g., a neutralizing amine), a drag reducing agent, and/or a high-purity dispersant. The water conditioning agent may help prevent corrosion, scale fouling, and/or bacterial buildup inside of piping 32 and the internal surfaces of equipment contacted by the water (e.g., steam turbine 30, HRSG 26). This can help improve the operating performance of the system and/or minimize or eliminate unexpected downtime attributable to water-related performance issues.

In the example of FIG. 1, plant 10 includes one or more metering devices 44 connected to one or more respective chemical additive reservoirs 46. Metering device 44 can operate to add one or more chemicals from reservoir 46 to the water to help condition the water. For example, metering device 44 may add one or more chemical agents from reservoir 46 that are selected to control the pH of the water and/or inhibit the formation and/or deposition of foulants on surfaces contacted by the water. Metering device 44 may be implemented as a pump (e.g., when chemical in reservoir 46 is in liquid form), a conveyor (e.g., when chemical in reservoir 46 is in solid form), and/or yet other type of metering device.

In the example of FIG. 1, plant 10 includes a controller 48. Controller 48 can be communicatively connected to various controllable components of plant 10 to manage the overall operation of the plant and/or connected components. For example, controller 48 can be communicatively connected to conductivity monitoring device 42, metering device 44, and/or any other sensors or process control devices in the system (e.g., to set the flow rate and/or temperature of the aqueous stream flowing through piping 32). In some implementations, conductivity monitoring device 42 is communicatively connected to a first controller while other components of plant 10 are communicatively connected to and/or controlled by one or more secondary controllers. In some implementations, conductivity monitoring device 42 may alert control room operators and/or other personnel to certain conditions, such as the presence of harmful impurities at concentrations above established targets and/or chemical feed conditions above or below target levels.

Controller 48 includes processor 50 and memory 52. Controller 48 communicates with communicatively connected components via a wired or wireless connection, which in the example of FIG. 1 is illustrated as a wired connection. Control signals sent from and received by controller 48 can travel over the connection. Memory 52 stores software for running controller 48 and may also store data generated or received by processor 50, e.g., from conductivity monitoring device 42. For example, memory 52 can store conductivity data, such as one or more conductivity thresholds. Controller 48 can reference the conductivity threshold data to process conductivity measurements of water analyzed by conductivity monitoring device 42 during operation, e.g., to control the addition of chemical via metering device 44 and/or the flow of water through piping 32. Processor 50 can run software stored in memory 52 to manage the functions attributable to controller 48.

In some examples, controller 48 can take various control actions based on the conductivity measurement information generated by conductivity monitoring device 42. For example, controller 48 may compare one or more measured conductivity values against one or more corresponding thresholds stored in memory 52 and take a corresponding control action if the measured conductivity exceeds one or more thresholds. In one example, controller 48 (or another system controller) may control plant 10 to adjust the aqueous stream flowing through piping 32 (e.g., by stopping the stream and stopping steam turbine 30; by adding make-up water to the stream; by adjusting the flow rate of the stream; by controlling purification of the stream). Additionally or alternatively, controller 48 may control metering device 44 to control the introduction of one or more chemical agents into the water stream based on a measured conductivity (e.g., start the metering device, stop the metering device, or adjust an operating rate of the metering device). In other implementations, an operator may manually control metering device 44 based on measured conductivity information according to the disclosure.

Controller 48 may be implemented using one or more controllers, which may be located at the facility site containing conductivity monitoring device 42 and/or remote therefrom. Controller 48 may communicate with one or more remote computing devices via a network. For example, controller 48 may communicate with a geographically distributed cloud computing network, which may perform any or all of the functions attributed to controller 48 in this disclosure.

It should be appreciated that configuration of combined cycle power plant 10 is merely one example of an aqueous fluid system that can utilize the conductivity monitoring devices and/or techniques according to the disclosure and the disclosure is not limited in this respect. For example, power plant 10 can have a variety of other designs as will be appreciated by those skilled in the art. For instance, power plant 10 may be designed as an integrated solar combined cycle plant in which a solar thermal field is integrated within the combined cycle plant. As another example, HRSG 26 can be designed to burn supplementary fuel after gas turbine 22 in a supplementary burner or duct burner. As still further examples, power plant 10 may be either a single-shaft arrangement, where both of gas turbine 22 and steam turbine 30 are connected to the same generator in a tandem arrangement or a multi-shaft arrangement, where gas turbine 22 and steam turbine 30 each drive a separate generator. In addition, power plant 10 may utilize exhaust heat from multiple gas turbines 22 to supply HRSG 26 or may supply multiple HRSG 26 units from a single gas turbine 22.

Figure 2:
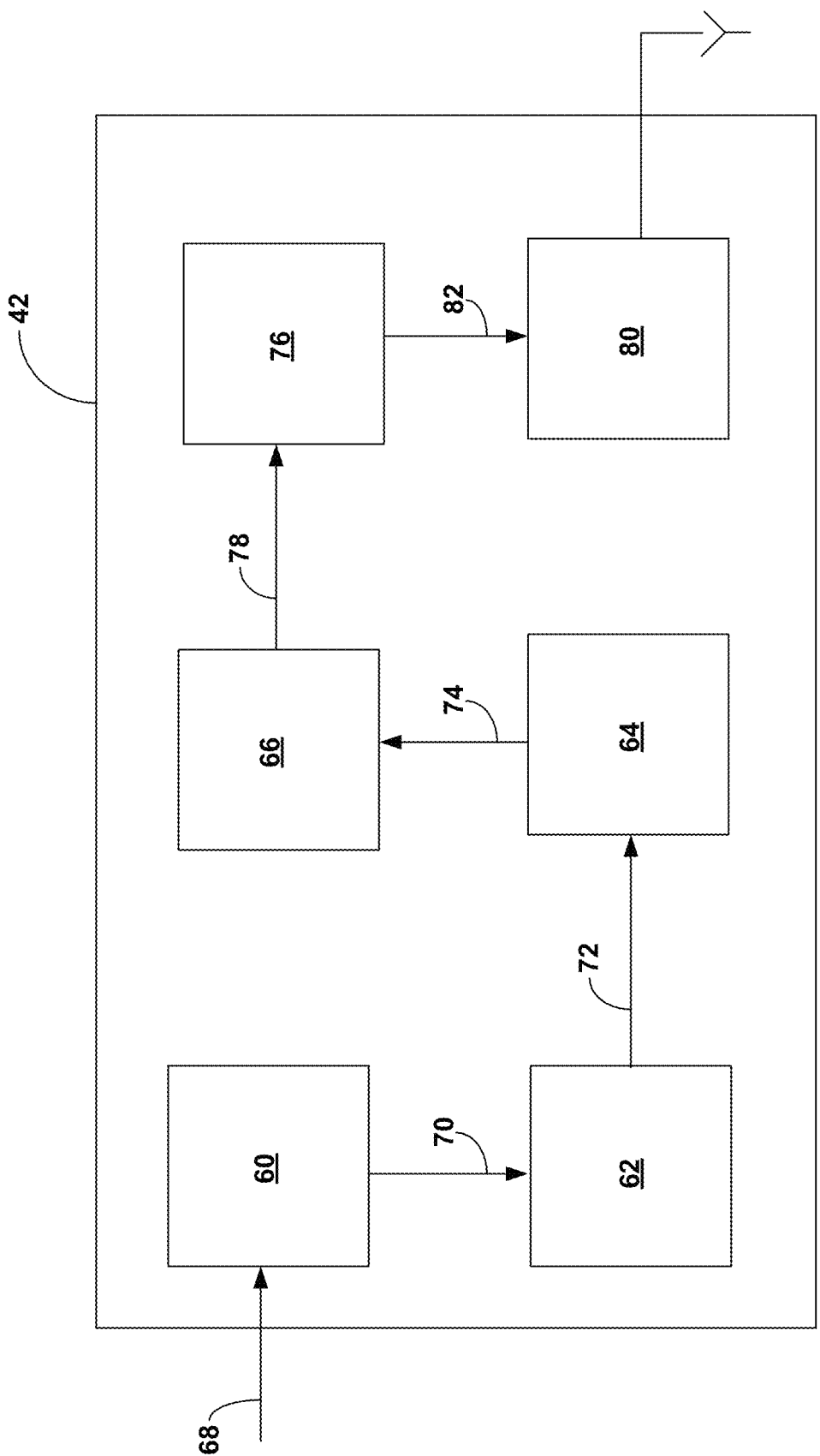
FIG. 2 is a block diagram illustrating an example conductivity monitoring device that can be utilized in combined cycle power plant of FIG. 1.

FIG. 2 is a block diagram illustrating an example conductivity monitoring device 42 that can be utilized in combined cycle power plant 10 of FIG. 1. In the illustrated example, conductivity monitoring device 42 includes a first conductivity sensor 60, a reaction chamber 62, a cation exchange resin 64, and a secondary conductivity sensor 66. First conductivity sensor 60 is fluidly connected to a sample line 68 for receiving a sample from an aqueous stream for analysis. Reaction chamber 62 is located downstream of first conductivity sensor 60 and can receive the sample after analysis by the first conductivity sensor via line 70. After processing in reaction chamber 62, the sample can flow to the cation exchange resin 64 via line 72 for processing before flowing to second conductivity sensor 66 via line 74.

Within conductivity monitoring device 42, first conductivity sensor 60 can measure the conductivity of the incoming fluid sample to provide a measured specific conductivity. The measured specific conductivity indicates the ability of the sample to conduct electricity. The conductivity of the sample is related to the concentration of ions in the sample. These conductive ions can come from dissolved salts and inorganic materials such as alkalis, chlorides, sulfides and carbonate compounds as well as from any water conditioning agents added to the sample, such as an organic water conditioning agent. The more ions that are present, the higher the conductivity of water. Likewise, the fewer ions that are present, the less conductive the sample will be.

In practice, the concentration of inorganic species (e.g., calcium, sodium, magnesium, iron, chloride, sulfate) in the sample may be comparatively low to avoid deposit formation or other water-related performance issues in the fluid system. For example, an operator of the system may monitor for the presence of corrosive anions (e.g., chloride, sulfate) to ensure that the corrosive anions remain at a level below that which will cause corrosion problems in the fluid system. As a result, the conductivity of the sample attributable to inorganic species present in the water may be comparatively low.

When a water conditioning agent is added to the water system, the water conditioning agent may change the conductivity of the water. For example, the water conditioning agent may itself be ionic and/or may dissociate into ionic species that change the conductivity of the water as compared to when the water conditioning agent is not added. Additionally or alternatively, the water conditioning agent may decompose into ionic species that affect the conductivity of the water.

For example, a variety of different organic water conditioning agents may be added to the water system to enhance the performance of the water and/or reduce fouling problems in the water system. These water conditioning agents may include a variety of neutralizing amines, polymers, and/or organic acids. For example, a neutralizing amine may be added to the water to help control the pH of the water, which can breakdown deposits formed in the water system. As another example, a dispersant may be added to the water to help reduce the ability of deposits to form in the water system. As still further example, a drag reducing agent may be added to the water to reduce turbulence in the fluid lines, which can allow the water to be pumped at lower pressures, saving energy and cost. In any case, the added water conditioning agent may increase the conductivity of the water as compared to the conductivity of the water without the added water conditioning agent.

An organic water conditioning agent added to the water stream may decompose over multiple cycles of circulation (e.g., vaporization and condensation) to form acid decomposition products. For example, the organic water conditioning agent may thermally decompose to form one or more organic acid species having a shorter carbon chain length than the carbon chain length of the organic water conditioning agent added to the water stream. Depending on the type of organic water conditioning agent added to the water stream, the organic water conditioning agent and/or acid decomposition products resulting from chemical breakdown of the conditioning agent may increase the conductivity of the water stream.

The addition of an organic water conditioning agent to the water can change the conductivity of the water, potentially masking the conductivity signal associated with inorganic species, such as corrosive anions, that may be present in the water. In other words, the measured specific conductivity value provided by first conductivity sensor 60 may include conductivity attributable to inorganic chemical species in the water and conductivity attributable to added organic chemical species (e.g., the organic water conditioning agent and/or acid decomposition products thereof). The magnitude of the conductivity associated with the organic chemical species added to the water may be greater than the magnitude of the conductivity associated with any inorganic species present in the water (e.g., at least 2 times greater, at least 5 times greater, at least 10 times greater, at least 100 times greater). As a result, addition of the organic water conditioning agent can obscure changes in conductivity attributable to changes in the concentration of inorganic chemical species in the water.

For these and other reasons, conductivity monitoring device 42 includes a reaction chamber 62. Reaction chamber 62 may be a portion of conductivity monitoring device 42 in which the aqueous sample is treated to breakdown organic molecules that interfere with measuring the conductivity associated with inorganic species in the sample. In different implementations, reaction chamber 62 may heat the aqueous sample to a temperature effective to breakdown organic molecules in the aqueous sample and/or irradiate the sample with light at a wavelength effective to breakdown organic molecules in the aqueous sample. As still another example, reaction chamber 62 may electrochemically breakdown organic molecules in the aqueous sample. A chemical reagent or combination of reagents may be added to reaction chamber 62 to further promote organic molecule breakdown. In either configuration, the organic molecules may breakdown via an oxidation reaction and/or other type of chemical reaction that ultimately results in the formation of carbon dioxide.

For instance, in one example, reaction chamber 62 may heat the aqueous sample to a temperature sufficient to thermally decompose organic molecules present in the sample (e.g., the organic water conditioning agent and/or acid decomposition products thereof) into carbon dioxide. The specific temperature to which the aqueous sample needs to be heated to affect thermal decomposition may vary depending on the molecular structure of the specific organic water conditioning agent added to the water (e.g., with larger chain and/or more complex molecules requiring greater energy to decompose). In some such examples, reaction chamber 62 may heat the aqueous sample to a temperature greater than 100° C., such as a temperature greater than 120° C., a temperature greater than 150° C., a temperature greater than 200° C., a temperature greater than 250° C., a temperature greater than 300° C., or a temperature greater than 350° C.

Additionally or alternatively, reaction chamber 62 may irradiate the aqueous sample with light at a wavelength and for a duration effective to decompose the interfering organic molecules. For example, reaction chamber 62 may irradiate the aqueous sample with ultraviolet light at one or more wavelengths falling within a range from 100 nm to 400 nm, such as light within the UVA range (e.g., 315 to 400 nm), within the UVB range (e.g., 280 to 315 nm), and/or within the UVC range (e.g., 100 to 280 nm).

Independent of how specifically the aqueous sample is treated in reaction chamber 62 to breakdown the interfering organic molecules (e.g., with application of heat and/or light), the sample may be treated for an amount of time effective to decompose substantially all interfering organic molecules (e.g., organic water conditioning agent added to the water sample and/or decomposition products thereof). For example, reaction chamber 62 may treat the aqueous sample under conditions and for an amount of time sufficient to decompose at least 95 mole percent of the interfering organic molecules present in the sample (e.g., to carbon dioxide) such that the decomposed organic molecules do not interfere with conductivity measurements subsequently made on the sample, such as at least 98 mole percent, at least 99 mole percent, at least 99.5 mole percent, or at least 99.9 mole percent. The concentration, and correspondingly electrical conductivity associated with, inorganic molecules present in the aqueous sample, such as corrosive anions, may be unaffected by the treatment of the sample in reaction chamber 62.

The duration of treatment time in reaction chamber 62 can be controlled in different ways. In some implementations, reaction chamber 62 comprises a flow through passageway in which the sample is treated (e.g., heated and/or irradiated) while continuously flowing through the reaction chamber. The duration of treatment time can be controlled by controlling the flow rate and/or length of the reaction chamber. In other implementations, reaction chamber 62 may be configured as a stop flow in which a portion of the aqueous sample is stocked in a static or non-flowing condition and treated for a set period of time before being released.

After the aqueous sample is treated in reaction chamber 62, the sample can flow via line 72 to cation exchange resin 64, which may be implemented as a column of material containing the cation exchange resin. In some implementations, a conductivity sensor may be included between reaction chamber 62 and cation exchange resin 64. Cation exchange resin 64 can be implemented as a polymer (e.g., in the form of small beads) that exchanges cations in the aqueous sample with hydrogen ions from the resin. As a result, the resin can convert ionic contaminants (e.g., corrosive anions) into a corresponding acid. For example, in the case of sodium chloride, the sodium chloride dissociates into sodium cations and chloride anions. The cation resin can remove the sodium, replacing it with a hydrogen (hydronium) ion to produce hydrochloric acid. The resulting conductivity measurement detects the anions present in the sample. Relative to cation contaminants such as sodium, the hydronium ion associated with an inorganic anion (e.g., chloride, sulfate) produces a higher conductance, making cation conductivity measurements more sensitive than specific conductivity measurements for detecting harmful anions in power plant systems. Accordingly, while referred to as cation conductivity, the conductivity measurement may also be referred to as acid conductance or conductivity after cation exchange (CACE).

After cation exchange resin 64 removes cations (e.g., sodium, potassium, calcium) from the aqueous solution and replaces the removed cations with hydrogen cations (e.g. hydronium ions), the conductivity of the process sample can be measured by second conductivity sensor 66. The aqueous sample can flow to second conductivity sensor 66 via line 74. Second conductivity sensor 66 can measure the conductivity of the aqueous sample to provide a measured cation conductivity. The measured cation conductivity indicates the concentration of anions present in the sample, such as inorganic anions having passed through reaction chamber 62. The conductive ions can come from dissolved salts and inorganic materials such as alkalis, chloride, and sulfate. Since interfering organic compounds have been removed from the aqueous sample, the measured cation conductivity provides an indication of the amount of inorganic anions present in the aqueous sample.

In some implementations, the aqueous sample may be degassed before or after measuring the conductivity of the sample with second conductivity sensor 66. In the example configuration of FIG. 2, conductivity monitoring device 42 includes a degasser 76. Degasser 76 is located downstream of second conductivity sensor 66 and can receive the aqueous sample from the second conductivity sensor via line 78. Degasser 76 can remove dissolved gas (e.g., carbon dioxide) from the aqueous sample. Furthermore, in some implementations, the conductivity of the aqueous sample may be measured after reaction chamber 62 and before cation exchange resin 64 (e.g., after degasser 76).

Carbon dioxide can complicate the interpretation of cation conductivity measurements because carbon dioxide may contribute to the conductivity of the sample itself (e.g., measured cation conductivity). Carbon dioxide, which may enter with the aqueous sample and/or be generated by reaction chamber 62, can dissolved in the water forming carbonic acid in equilibrium with the carbon dioxide. Carbonic acid may be weakly ionized and contribute to the cation conductivity. Accordingly, the aqueous sample may be degassed to help remove the carbon dioxide from the sample and reduce or eliminate conductivity associated with the carbon dioxide.

Degasser 76 can be implemented in a number of different ways to remove the carbon dioxide from the aqueous sample. As one example, degasser 76 may heat the aqueous sample to a temperature near the boiling point. High temperature reduces the solubility of carbon dioxide, thereby forcing the carbon dioxide out of solution. Loss of carbon dioxide upsets the equilibrium between carbon dioxide, carbonic acid, and bicarbonate, causing the formation of more carbon dioxide, which is also driven out until all the gases are expelled from the aqueous sample. As another example, degasser 76 may sparge the sample with an inert gas (e.g., nitrogen). In this example, the driving force may not be heat but rather the low partial pressure of carbon dioxide in the scrubbing gas. Carbon dioxide from the aqueous sample dissolves in the scrubbing gas stream where it is subsequently exhausted from the degasser, thereby depleting the aqueous sample of carbon dioxide.

Conductivity monitoring device 42 in the example of FIG. 2 includes a third conductivity sensor 80 positioned downstream of reaction chamber 62, cation resin 64, and degasser 76. Conductivity sensor 80 can receive the aqueous sample from the degasser via line 82. Conductivity sensor 80 can measure the conductivity of the aqueous sample after removing organic interferences, treatment with cation resin, and degassing.

Features described as conductivity sensors may be implemented using any type of suitable conductivity sensor technology, including those commercially available. Most conductivity sensors measure the electrical conductivity of a solution by determining the resistance of the solution between two electrodes separated by a fixed distance. An alternating voltage may be applied in order to avoid electrolysis. The resistance may be measured by a conductivity meter. Common types of conductivity sensors include electrode-based sensors and inductive sensors.

Independent of the specific type or types of conductivity sensors used in conductivity monitoring device 42, the conductivity sensors may be implemented as continuous flow devices and/or as static flow devices, e.g., to measure a liquid aqueous sample. In a continuous flow implementation, the conductivity of the aqueous sample may be measured as the sample flows past and/or through the conductivity sensor. By contrast, in a static flow implementation, the conductivity of the aqueous sample may be measured as the sample is positioned statically, non-flowing. A flow-through arrangement may be beneficial for continuous, online measurements.

Conductivity monitoring device 42 can have a number of other features not illustrated on FIG. 2. For example, conductivity monitoring device 42 may include a temperature sensor and/or pressure sensor for measuring the temperature and/or pressure of the aqueous sample. As another example, conductivity monitoring device 42 may include a power source (e.g., wall or mains power, battery power) to power the operational components of the system. As a further example, although controller 48 is illustrated in FIG. 1 as being physically separate from conductivity monitoring device 42, in other examples, the controller may be integrated with the device (e.g., within a common housing). In either case, controller 48 can control all operational aspects of conductivity monitoring device 42 (e.g., valves, pumps, sensors) to perform the functions attributable to the device herein.

The systems, devices, and techniques of the present disclosure can facilitate the use of a variety of organic additives in power plant 10 (FIG. 1) that may not otherwise be usable because of conductivity masking problems or other reasons. One example class of organic water conditioning agent that may be used is neutralizing amine, e.g., to help prevent acidic corrosion. Example organic neutralizing amines that may be used include, but are not limited to, dimethylamine (DMA), methoxypropylamine (MOPA), monoethanolamine (MEA), cyclohexylamine, morpholine, picolines (alkyl pyridines), trimethylamine (TMA), and combinations thereof.

Another class of organic water conditioning agent that may be used additionally or alternative is a drag reducing agent. Drag reducing agents are long polymeric chain molecules that help reduce turbulence at the pipe wall by affecting turbulent eddy size and reducing fluid drag on a pipe wall. Drag reducing agents can be grouped into synthetic and natural polymers. Examples of synthetic drag reducing agents include, but are not limited to, polyethylene oxide, polyisobutylene, polyacrylamide (PAM), partially hydrolyzed polyacrylamide (HPAM), and combinations thereof. Natural polymers include carboxymethylcellulose (CMC), guar gum (GG), xanthan gum (XG), and the like.

Yet another class of organic water conditioning agent that may be used in addition to or in lieu of those discussed above is a high-purity dispersant. A high-purity dispersant can be applied to improve energy efficiency, e.g., by removing a portion of loosely deposited material from heat transfer surfaces without contributing harmful impurities to HRSG 26 or associated piping 32. Furthermore, a high-purity dispersant can be applied to reduce the rate of deposit accumulation on heat transfer surfaces, thereby extending the time interval between costly interventions to recover heat transfer efficiency (e.g., mechanical cleaning, chemical cleaning). Example dispersants that may be produced in high-purity form and subsequently used include, but are not limited to, an acrylic acid polymer, a methacrylic acid polymer, an acrylate polymer, a methacrylate polymer, copolymers, and terpolymers, an acrylate/acrylamide copolymer, an acrylate/methacrylate copolymer, terpolymers, and combinations thereof. Example high-purity polymer dispersants are described in U.S. Pat. Nos. 5,864,596; 6,228,950; and 6,430,249.

Certain polymers or additive molecules may by nature or design perform multiple functions, such as dispersion and drag reduction. Furthermore, different additive chemicals may be mixed into a single solution to provide one or more functions (e.g. pH adjustment and dispersion or dispersion and drag reduction) simultaneously or, in other examples, may be provided as separate solutions separately added to the water stream being treated.

Figure 3:
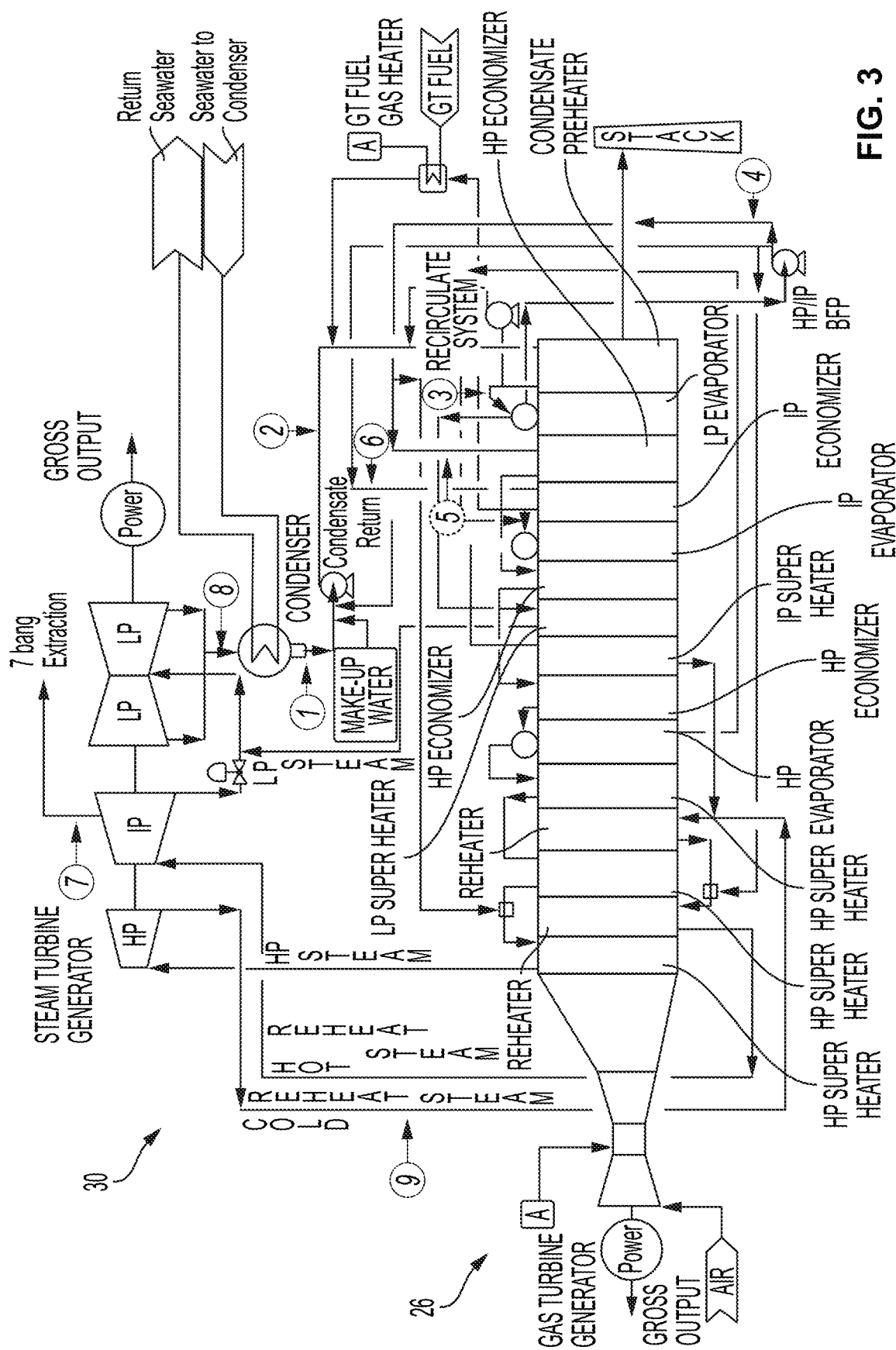
FIG. 3 is a diagram of an example configuration of a HRSG with associated water/steam cycle flows.

FIG. 3 is a diagram of an example configuration of HRSG 26 with associated water/steam cycle flows. As shown, HRSG 26 is fluidly coupled to steam turbine 30 which, in the illustrated configuration, includes a high-pressure turbine (HP), intermediate-pressure turbine (IP), and a low-pressure turbine (LP). FIG. 3 illustrates example locations where one or more organic water conditioning agents may be introduced into the HRSG fluid system. Table 1 below describes the example locations noted on FIG. 3 for introducing an organic water conditioning agent.

TABLE 1

Example injection locations for organic water conditioning agents in a HRSG fluid system.

| FIG. 3 Reference | Plant Location | Example Chemical Applications and Application Tactics |
| --- | --- | --- |
| 1 | Condenser Hotwell or condenser outlet piping | Chemical Treatment: surfactant, dispersant, amine, film forming product, chelating agent, drag reduction polymer, reducing agent, oxidizing agent<br>Application Tactics: chemical treatment during initial fill, condensate system or hotwell drain and refill, feed & bleed, system recirculation for flushing, installed or temporary filtration and/or demineralization, continuous chemical feed, intermittent chemical feed, blowdown management |
| 8 | Low Pressure Turbine Exhaust Hood Sprays | Chemical Application: surfactant, dispersant, chelating agent<br>Application Tactics: fail open condenser hood spray valves during condensate system flushing to establish chemically treated hood spray flow prior to turbine roll |
| 2, 3 | Hotwell or Condensate Pump Discharge and/or Condensate Preheater Outlet | Chemical Application: surfactant, dispersant, amine, film forming product, chelating agent, drag reduction polymer, reducing agent, oxidizing agent<br>Application Tactics: chemical treatment during initial fill, condensate system or hotwell drain and refill, feed & bleed, system recirculation for flushing, installed or temporary filtration and/or demineralization, continuous chemical feed, intermittent chemical feed, blowdown management |

TABLE 1-continued

Example injection locations for organic water conditioning agents in a HRSG fluid system.

| FIG. 3 Reference | Plant Location | Example Chemical Applications and Application Tactics |
|---|---|---|
| 2 | Condensate Polisher (where applicable) (Filter Demineralizers) | Chemical Application: surfactant, dispersant, amine, chelating agent<br>Application Tactics: chemically enhanced backwash, chemically treated septa soaks |
| 2 | Condensate Polisher (where applicable) (Deep Bed Demineralizers) | Chemical Application: surfactant, dispersant, amine, chelating agent<br>Application Tactics: chemically optimized resin backwash and separation, improved resin cleaning to restore kinetics, chemically treated vessel soaks to reduce sight glass and lateral fouling |
| 2 | Condensate Polisher Outlet (where applicable) | Chemical Application: surfactant, dispersant, amine, film forming product, chelating agent, drag reduction polymer, reducing agent, oxidizing agent<br>Application Tactics: chemical treatment during initial fill, condensate system or hotwell drain and refill, feed & bleed, system recirculation for flushing, continuous chemical feed, intermittent chemical feed |
| 4, 5, 6 | Boiler Feed Pump Discharge | Chemical Application: surfactant, dispersant, amine; film forming product, chelating agent, reducing agent, oxidizing agent<br>Application Tactics: blowdown management, system recirculation for flushing, batch chemical addition, intermittent chemical feed, continuous chemical feed |
| 7 | Turbine Extraction Steam | Chemical Application: surfactant, dispersant, amine, film forming product, chelating agent, drag reduction polymer, reducing agent, oxidizing agent<br>Application Tactics: chemical treatment during non-operational and operational periods, continuous chemical feed, intermittent chemical feed |
| 9 | Cold Reheat Steam | Chemical Application: dispersant, amine; film forming product<br>Application Tactics: blowdown management, batch chemical addition, intermittent chemical feed, continuous chemical feed |

Independent of the type of organic water conditioning agent added to the aqueous stream and the injection location, a variety of control actions may be taken based on the conductivity measurements made by conductivity monitoring device 42. As one example, controller 48 (or another system controller) may adjust the amount of one or more water conditioning agents added to the stream based on the specific conductivity measured by first conductivity sensor 60. The controller can compare the measured specific conductivity to one or more specific conductivity thresholds stored in memory 52 and take a corresponding control action if the measured specific conductivity exceeds one or more thresholds. For example, controller 48 may control metering device 44 to adjust the introduction of one or more chemical agents into the water stream based on a measured specific conductivity (e.g., start the metering device, stop the metering device, or increase or decrease an operating rate of the metering device).

As another example, controller 48 (or another system controller) may control the aqueous stream supplied to HRSG 26 based on the cation conductivity measured by second conductivity sensor 66 and/or third conductivity sensor 80. The controller can compare the measured cation conductivity and/or degassed cation conductivity, both purified of interfering organics, to one or more conductivity thresholds stored in memory and take a corresponding control action if the measured conductivity exceeds one or more thresholds. For example, the controller may shutdown the steam generator and/or flow of the aqueous stream and/or change the aqueous stream (e.g., by adding make-up water to the stream; by adjusting the flow rate of the stream) in response to detecting an increase in the measured conductivity, which may indicate an increase in harmful contaminants potentially damaging to the power facility.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method for chemically treating water supplied to a steam generator, the method comprising:
   introducing an organic water conditioning agent into an aqueous stream that is supplied to a steam generator, the steam generator generating steam from the aqueous stream containing the organic water conditioning agent to drive a steam turbine;
   drawing a sample of the aqueous stream containing the organic water conditioning agent and any acid decomposition products thereof;
   measuring a conductivity of the sample to provide a measured specific conductivity of the sample;
   after measuring the conductivity of the sample, at least one of irradiating the sample and heating the sample, thereby causing the organic water conditioning agent and any acid decomposition products thereof to decompose into a gaseous byproduct;
   after at least one of irradiating the sample and heating the sample, passing the sample through a cation exchange resin to remove cations from the sample; and
   after passing the sample through the cation exchange resin, measuring a conductivity of the sample to provide a measured cation conductivity for the sample.

2. The method of claim 1, further comprising adjusting an amount of the organic water conditioning agent added to the aqueous stream based on the measured specific conductivity of the sample.

3. The method of claim 1, further comprising controlling the aqueous stream based on the measured cation conductivity of the sample.

4. The method of claim 1, wherein at least one of irradiating the sample and heating the sample comprises irradiating the sample with ultraviolet light.

5. The method of claim 1, wherein the organic water conditioning agent comprises at least one of a neutralizing amine, a drag reducing agent, and a dispersant.

6. The method of claim 1, wherein the organic water conditioning agent comprises a polymeric dispersant selected from the group consisting of acrylic acid polymer, methacrylic acid polymer, acrylate polymer, methacrylate polymer, copolymers, and terpolymers, acrylate/acrylamide copolymer, acrylate/methacrylate copolymer, terpolymers, and combinations thereof.

7. The method of claim 1, wherein:
   drawing the sample comprises drawing a continuous sample stream from the aqueous stream containing the organic water conditioning agent and any acid decomposition products thereof;
   measuring the conductivity of the sample to provide the measured specific conductivity comprises measuring the conductivity of the continuous sample stream;
   at least one of irradiating the sample and heating the sample comprises at least one of irradiating the continuous sample stream and heating the continuous sample stream;
   passing the sample through the cation exchange resin comprises passing the continuous sample stream through the cation exchange resin; and
   measuring the conductivity of the sample to provide the measured cation conductivity comprises measuring the conductivity of the continuous sample stream.

8. The method of claim 1, wherein the steam generator is a heat recovery steam generator.

9. The method of claim 1, wherein the steam generator is a heat recovery steam generator within a combined cycle power plant.

10. The method of claim 1, further comprising after measuring the conductivity of the sample to provide the measured specific conductivity for the sample, degassing the sample and measuring the conductivity of the sample to provide a measured degassed cation conductivity for the sample.

11. The method of claim 1, wherein the gaseous byproduct comprises carbon dioxide.

12. The method of claim 1, wherein introducing the organic water conditioning agent into the aqueous stream comprises introducing the organic water conditioning agent into at least one of a condenser hot well, condensate piping, a demineralizer vessel, a resin regeneration tank, a filter vessel, a heater drain, an extraction line, a turbine exhaust hood, and a boiler feed inlet.

13. A method for chemically treating water used by a heat recovery steam generator in a combined cycle power plant, the method comprising:
   introducing an organic water conditioning agent into an aqueous stream;
   supplying the aqueous stream to a heat recovery steam generator that generates steam using thermal energy in an exhaust gas from a gas turbine, the steam generated by the heat recovery steam generator being supplied to a steam generator;
   drawing a sample of the aqueous stream containing the organic water conditioning agent and any acid decomposition products thereof;
   measuring a conductivity of the sample to provide a measured specific conductivity of the sample;
   after measuring the conductivity of the sample, at least one of irradiating the sample and heating the sample, thereby causing the organic water conditioning agent and any acid decomposition products thereof to decompose into a gaseous byproduct;
   after at least one of irradiating the sample and heating the sample, passing the sample through a cation exchange resin to remove cations from the sample;
   after passing the sample through the cation exchange resin, measuring a conductivity of the sample to provide a measured cation conductivity for the sample;

adjusting an amount of the organic water conditioning agent added to the aqueous stream based on the measured specific conductivity of the sample; and controlling supply of the aqueous stream to the heat recovery steam generator based on the measured cation conductivity of the sample.

14. The method of claim 13, wherein at least one of irradiating the sample and heating the sample comprises irradiating the sample with ultraviolet light.

15. The method of claim 13, wherein the organic water conditioning agent comprises at least one of a neutralizing amine, a drag reducing agent, and a dispersant.

16. The method of claim 13, wherein the organic water conditioning agent comprises a polymeric dispersant selected from the group consisting of acrylic acid polymer, methacrylic acid polymer, acrylate polymer, methacrylate polymer, copolymers, and terpolymers, acrylate/acrylamide copolymer, acrylate/methacrylate copolymer, terpolymers, and combinations thereof.

17. The method of claim 13, wherein:
drawing the sample comprises a continuous sample stream from the aqueous stream containing the organic water conditioning agent and any acid decomposition products thereof;
measuring the conductivity of the sample to provide the measured specific conductivity comprises measuring the conductivity of the continuous sample stream;
at least one of irradiating the sample and heating the sample comprises at least one of irradiating the continuous sample stream and heating the continuous sample stream;
passing the sample through the cation exchange resin comprises passing the continuous sample stream through the cation exchange resin; and
measuring the conductivity of the sample to provide the measured cation conductivity comprises measuring the conductivity of the continuous sample stream.

18. The method of claim 13, further comprising after measuring the conductivity of the sample to provide the measured specific conductivity for the sample, degassing the sample and measuring the conductivity of the sample to provide a measured degassed cation conductivity for the sample.

19. The method of claim 13, wherein the gaseous byproduct comprises carbon dioxide.

20. The method of claim 13, wherein:
adjusting the amount of the organic water conditioning agent added to the aqueous stream based on the measured specific conductivity of the sample comprises comparing the measured specific conductivity to a specific conductivity threshold and increasing the amount of the organic water conditioning agent added to the aqueous stream when the measured specific conductivity is less than the specific conductivity threshold; and controlling supply of the aqueous stream to the heat recovery steam generator based on the measured cation conductivity of the sample comprises comparing the measured cation conductivity to a specific conductivity threshold and terminating flow of the aqueous stream to the heat recovery steam generator when the measured cation conductivity exceeds the specific conductivity threshold.

21. A combined cycle power plant system comprising:
a steam turbine;
a heat recovery steam generator operable connected to the steam turbine to provide steam to the steam turbine;
a condenser;
piping fluidly connecting, directly or indirectly the heat recovery steam generator to the steam turbine, the steam turbine to the condenser, and the condenser to the heat recovery steam generator, the piping defining a fluid network through which an aqueous stream is configured to flow;
a conductivity monitoring device positioned to receive a sample of the aqueous stream from the piping, the conductivity monitoring device comprising:
a first conductivity sensor configured to measure a conductivity of the sample to provide a measured specific conductivity of the sample;
a reaction chamber configured to receive the sample after measurement by the first conductivity sensor and at least one of irradiate the sample and heat the sample;
a cation exchange resin positioned downstream of the reaction chamber and configured to remove cations from the sample;
a second conductivity sensor configured to measure a conductivity of the sample downstream of the cation exchange resin to provide a measured cation conductivity for the sample; and
a metering device positioned to control addition of an organic water conditioning agent into the aqueous stream.

22. The system of claim 21, wherein the reaction chamber is configured to irradiate the sample with UV light.

23. The system of claim 21, further comprising a controller communicatively coupled to the metering device and configured to control the amount of the organic water conditioning agent added to the aqueous stream based on the measured specific conductivity of the sample.

* * * * *